United States Patent
Prosser et al.

(10) Patent No.: US 6,983,459 B1
(45) Date of Patent: Jan. 3, 2006

(54) INCORPORATING REGISTER PRESSURE INTO AN INLINING COMPILER

(75) Inventors: Edward Curtis Prosser, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/286,862

(22) Filed: Apr. 6, 1999

(51) Int. Cl.
G06F 9/45 (2006.01)

(52) U.S. Cl. ..................... 717/158; 717/145

(58) Field of Classification Search .............. 717/9, 717/151, 5, 7, 8, 4, 136, 146, 143, 124, 152, 717/154–158, 145, 128, 130–133

See application file for complete search history.

(56) References Cited

U.S. PATENT DOCUMENTS

| | | | | |
|---|---|---|---|---|
| 5,530,866 A | * | 6/1996 | Koblenz et al. | 717/144 |
| 5,701,489 A | * | 12/1997 | Bates et al. | 717/157 |
| 5,740,443 A | * | 4/1998 | Carini | 717/133 |
| 5,768,595 A | * | 6/1998 | Gillies | 717/145 |
| 5,890,000 A | * | 3/1999 | Aizikowitz et al. | 717/154 |
| 5,937,196 A | * | 8/1999 | Schmidt et al. | 717/155 |
| 5,946,491 A | * | 8/1999 | Aizikowitz et al. | 717/158 |
| 5,987,259 A | * | 11/1999 | Goebel | 717/152 |
| 6,026,234 A | * | 2/2000 | Hanson et al. | 717/133 |
| 6,072,951 A | * | 6/2000 | Donovan et al. | 717/158 |
| 6,175,956 B1 | * | 1/2001 | Hicks et al. | 717/114 |
| 6,195,793 B1 | * | 2/2001 | Schmidt | 717/151 |
| 6,292,940 B1 | * | 9/2001 | Sato | 717/157 |
| 6,305,014 B1 | * | 10/2001 | Roediger et al. | 717/154 |

OTHER PUBLICATIONS

Jagannathan-Wright, Flow-directed Inlining, May 1996, ACM.*

(Continued)

Primary Examiner—Antony Nguyen-Ba
(74) Attorney, Agent, or Firm—Owen J. Gamon; Grant A. Johnson

(57) ABSTRACT

A method, system, and program product for optimizing compilation. In the preferred embodiment, a compiler compiles a source-code file twice; once to gather register-pressure data, and a second time to apply the data. Thus, the compiler saves register-pressure data during the first compilation and uses it during the second compilation to make informed inlining decisions. The compiler saves two kinds of data during the first compilation: (1) the maximum register-pressure occurring in each procedure; and (2) within each procedure, the register pressure at each call site that is a potential inlining candidate. This data is then fed into the compiler during the second compilation. The compiler uses the data during the second compilation in two ways. First, when deciding whether to inline a child procedure into a parent procedure, the compiler determines whether the sum of the maximum register-pressure and the site register-pressure exceeds the number of available, physical registers. If so, the inlining is not done. Otherwise, inlining is permitted subject to other heuristics. Second, if the child procedure is chosen for inlining into the parent procedure, the maximum register-pressure of the parent procedure is set to be the maximum of its existing value or the sum of the maximum register-pressure of the child procedure and the site register-pressure. This assures that later consideration of the parent procedure for inlining into another procedure can be done with accurate register-pressure data available.

24 Claims, 8 Drawing Sheets

OTHER PUBLICATIONS

Serrano, Inline expansion: when and how, 1997, Centre Universitaire d'Informatique, Universite of Geneva.*

Silicon Graphics, Inc., MIPSpro Compiling and Performance Tuning Guide, Apr. 1999.*

Holzle et al., Optimizing Dynamically-Dispatched Calls with Run-Time Type Feedback, Jun. 1994, SIGPLAN Conference on Programming Language Design and Implementation, Orlando, FL.*

U.S. Appl. No. 08/950,612, filed Oct. 15, 1997, Donovan et al., "Profile—Driven Inlining of Frequently Executed Paths", now US 6,072,951.

U.S. Appl. No. 09/120,635, filed Jul. 22, 1998, William Jon Schmidt., "Method and Computer Program Product for Adaptive Inlining in a Computer System", now US 6,195,793.

* cited by examiner

INCORPORATING REGISTER PRESSURE INTO AN INLINING COMPILER

FIELD OF THE INVENTION

The invention relates to optimizing compilers and methods of compiling. More particularly, the invention relates to using register pressure in an inlining compiler.

BACKGROUND OF THE INVENTION

Compilers are generally used to transform one representation of a computer program into another representation. Typically, but not exclusively, compilers are used to transform a human-readable form of a program, such as source code, into a machine-readable form, such as object code.

One type of compiler is an optimizing compiler, which optimizes object code in order to enhance its performance. An optimizing compiler can attempt to enhance performance by reducing the overhead associated with two common, programming techniques known as procedural programming and object-oriented programming.

In procedural programming, a program is broken into many small procedures, each including a sequence of statements (and in some cases, data), and each of which is responsible for particular, well-defined activities. The procedures are invoked, or called, when particular actions are needed. Typically, procedures can invoke each other, as part of operation of the program. In such a situation, the procedure that is invoked is typically referred to as the "child" procedure, and the procedure that invokes the child procedure is referred to as the "parent" procedure. When the parent procedure invokes the child procedure, control is transferred from the parent to the child, so that the child is now executing instead of the parent.

While procedural programming can simplify programming effort and reduce complexity, one of the unfortunate results of a highly-procedural computer program is that the program, when operating, frequently transfers control between the various procedures (i.e., it executes "procedure calls"). This creates overhead that degrades performance of the program because each transfer of control between procedures requires multiple computer operations, both to transfer flow control to a procedure and to return flow control from the procedure.

A similar, unfortunate result occurs in object-oriented programming. In object-oriented programming, data and a set of procedures (called "methods") are encapsulated together, and only the procedures encapsulated with data are permitted to modify that data. This style of programming naturally causes procedure calls to proliferate and procedure sizes to shrink, typically to a greater extent than in procedural programming.

To address this problem of high procedure-call overhead, modern compilers optimize programs so as to avoid procedure calls. One optimization approach is called inlining. Although the details can be somewhat complex, the idea is simple: the compiler replaces a call to a procedure by a duplicate of the body of the called procedure. The advantages of inlining are (1) removal of the call overhead required by the procedure-calling conventions; and (2) increased optimization opportunities that can arise when the compiler can see the called-procedure's instructions in context.

Of course, there are disadvantages to inlining as well. One problem that can arise is that of excessive register pressure. Register pressure is a measure of the number of values that must be remembered by the compiled program at a given point during execution. For example, in a complex mathematical expression, it may be necessary to keep a number of different values in registers at the same time, as intermediate results of the expression. If the number of registers required at any point (the pressure) exceeds the number of available physical registers in the processor, some of the values must be maintained in slower main memory instead of the registers. Thus, we say that some of the values have been "spilled" to main memory.

It is, therefore, undesirable to inline a child procedure into a parent procedure if to do so would increase register pressure to the point that register spill occurs (or at least to the point that the cost of any spill that does occur exceeds the benefit from inlining). Prior inliners have not adequately addressed this problem. Some inliners do nothing at all to address the problem, in which case performance is reduced when a register spill occurs. Other inliners have avoided unnecessary register pressure by indirect means such as not allowing the parent procedure to grow beyond a threshold size due to inlining. But, procedure size is not a reliable measure of register pressure; very large procedures do not necessarily suffer from register spill. Thus, these inliners fail to gain the performance benefits of inlining in many cases where it would improve performance greatly.

Thus, there is a need for a compiler that will make direct use of register-pressure information in making inlining decisions.

SUMMARY OF THE INVENTION

The present invention is a method, system, and program product for optimizing compilation. In the preferred embodiment, a compiler compiles a source-code file twice; once to gather register-pressure data, and a second time to apply the data. Thus, the compiler saves register-pressure data during the first compilation and uses it during the second compilation to make informed inlining decisions. The compiler saves two kinds of data during the first compilation: (1) the maximum register-pressure occurring in each procedure; and (2) within each procedure, the register pressure at each call site that is a potential inlining candidate. This data is then fed into the compiler during the second compilation.

The compiler uses the data during the second compilation in two ways. First, when deciding whether to inline a child procedure into a parent procedure, the compiler determines whether the sum of the maximum register-pressure and the site register-pressure exceeds the number of available, physical registers. If so, the inlining is not done. Otherwise, inlining is permitted subject to other heuristics. Second, if the child procedure is chosen for inlining into the parent procedure, the maximum register-pressure of the parent procedure is set to be the maximum of its existing value or the sum of the maximum register-pressure of the child procedure and the site register-pressure. This assures that later consideration of the parent procedure for inlining into another procedure can be done with accurate register-pressure data available.

DETAILED DESCRIPTION

Figure 1:
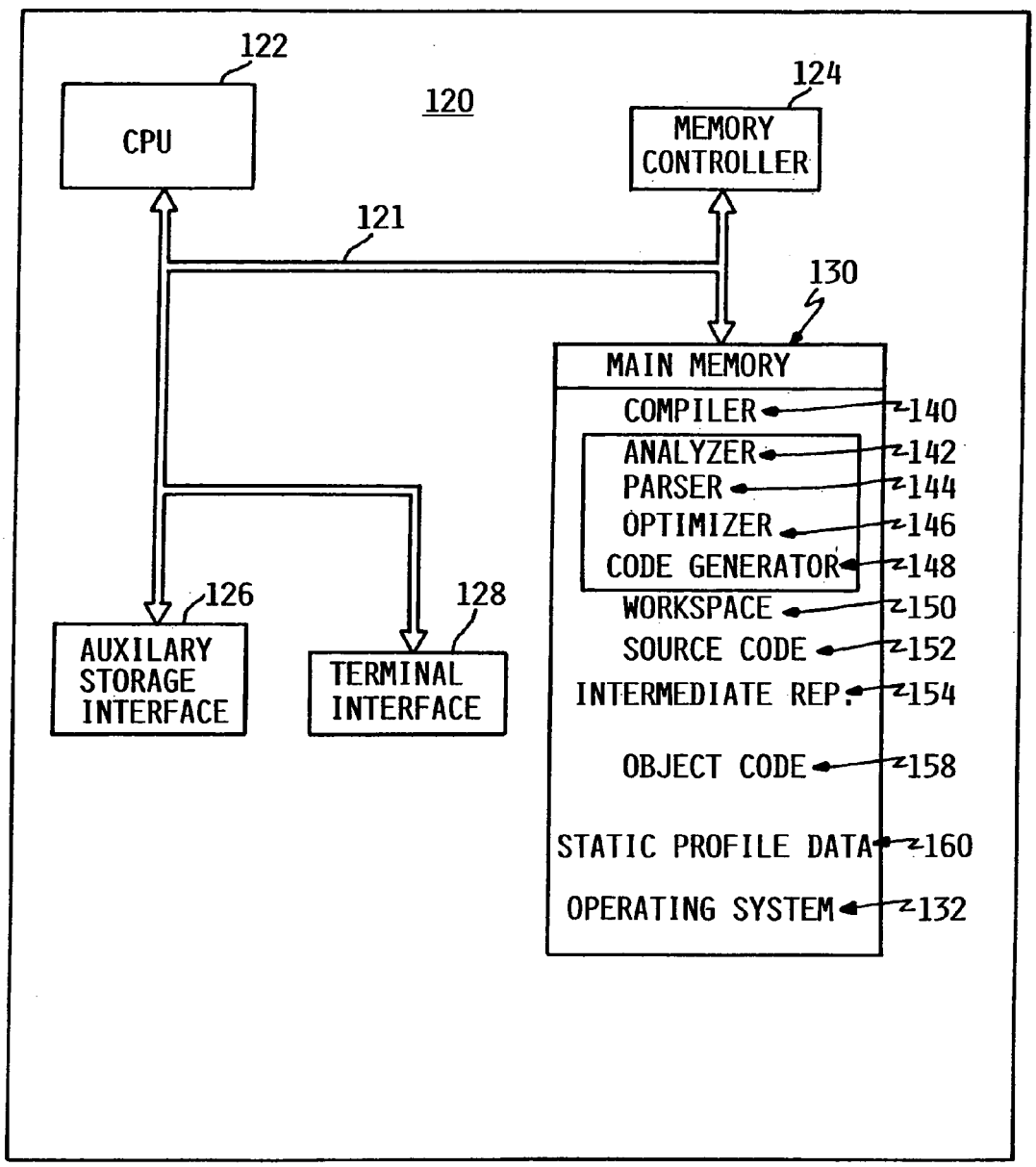
FIG. 1 is a block diagram of a computer system of the preferred embodiment.

Prior to discussing the operation of embodiments of the invention, a brief overview discussion of compilers and compiling techniques is provided herein.

Overview of Compilers

Compilers are generally used to transform one representation of a computer program into another representation. Typically, but not exclusively, compilers are used to transform a human-readable form of a program, such as source code, into a machine-readable form, such as object code.

A computer program suitable for compilation by a compiler is composed of a series of "statements". Some statements generate, modify, retrieve, or store information. Other statements may control the flow of the program, for example, by testing the value of a variable and causing program flow to continue in different directions based on that value. In most programs of any significant length, the statements are collected into "procedures", which perform well-defined functions and can be used in potentially multiple places with the program. Frequently, the procedures in a large program are further collected into "modules", each of which is responsible for a particular major subset of the functions of the program. In a program structure of this kind, the compiler is used to compile the modules individually, after which the compiled modules are "linked" together to form a single, cohesive computer program. This approach allows the programmer to upgrade or debug, and then re-compile, each module separately, without need for re-compiling the other modules.

One type of compiler is an optimizing compiler, which includes an optimizer for enhancing the performance of the machine-readable representation of a program. Some optimizing compilers are separate from a primary compiler while others are built into a primary compiler to form a multi-pass compiler. Both types of compilers may operate either on a human-readable form, a machine-readable form, or any intermediate representation between these forms.

A type of optimizing compiler is a multi-pass, optimizing compiler, which includes a front end for converting source code into an intermediate representation, and a back end for generating object code from the intermediate representation.

The front end of a multi-pass, optimizing compiler typically includes a lexicographic analyzer which identifies tokens or keywords in the source code, and a parser which analyzes the program statement by statement. The parser typically uses a context-free grammar to determine if program statements satisfy a set of grammar rules, and builds constructs. The parser then generates an intermediate representation using an intermediate code generator.

The back end of a multi-pass, optimizing compiler typically includes an optimizer which operates on the intermediate representation to generate a revised or optimized intermediate representation. Several different optimizations may be performed, including but not limited to local optimizations such as value numbering, elimination of redundant computations, register allocation and assignment, instruction scheduling to match specific machine characteristics, moving invariant code out of loops, strength reduction, induction variable elimination, and copy propagation, among others. The back end also includes a final code generator to generate the object code from the revised intermediate representation.

A compiler may reside within the memory of the computer system upon which the object code generated by the compiler is executed. Alternatively, a compiler may be a cross-compiler which resides on one computer system to generate object code for execution on another computer system. Either type of compiler may be used consistent with the invention.

One suitable back end for use with the invention is an AS/400 optimizing translator supplied with an AS/400 computer, which is a common back-end of an optimizing compiler.

This product may be used with a front end such as the ILE C Compiler available from IBM, among others. It will be appreciated that other compilers are suitable for different languages and/or different hardware platforms, and may also be used in the alternative.

One optimization technique is known as "profiling" the program. A program is profiled by compiling the program and delivering it to a test environment that simulates actual field operation of the program. While the program operates in the test environment, records are kept on the extent to which certain sections of the program are used. After the test has been completed, the profile records are used by an optimizing compiler to recompile the program in a manner that enhances the efficiency of the program. For example, one known technique is to place sections of the program that are used at approximately the same time in nearby memory locations, so as to speed access to the program.

A common computer-programming approach is known as procedural programming. In procedural programming, a program is broken into many small procedures, each including a sequence of statements (and in some cases, data), and each of which is responsible for particular well-defined activities. The procedures are invoked when particular actions are needed. Typically, procedures can invoke each other, as part of operation of the program. In such a situation, the procedure that is invoked is typically referred to as the "child" procedure, and the procedure that invokes the child procedure is referred to as the "parent" procedure.

While procedural programming can simplify programming effort and reduce complexity, one of the unfortunate results of a highly-procedural computer program is that the program, when operating, frequently transfers control between the various procedures (i.e., it executes "procedure calls"). This creates a substantial overhead, in that each transfer of control between procedures requires multiple computer operations, both to transfer flow control to a procedure and to return flow control from the procedure.

A similar unfortunate result occurs in so-called "object oriented" programming. In object oriented programming, data and a set of procedures (called "methods") are encapsulated together, and only the procedures encapsulated with data are permitted to modify that data. This style of programming naturally causes procedure calls to proliferate and procedure sizes to shrink, typically to a greater extent than procedural programming.

To address the problem of high procedure-call overhead, modern compilers optimize programs so as to avoid procedure calls. One optimization approach is called inlining. Although the details can be somewhat complex, the idea is simple: a call to a procedure can be replaced by a duplicate of the body of the called procedure. The advantages of inlining are (1) removal of the call overhead required by the procedure calling conventions, and (2) increased optimization opportunities that can arise when the compiler can see the called procedure's instructions in context.

Computer System

Turning to the Drawing, wherein like numbers denote like parts throughout the several views, FIG. 1 shows a block diagram of computer system 120 consistent with the preferred embodiment. The hardware components of computer system 120 could be implemented as an IBM AS/400 computer. But, the mechanisms and apparatus consistent with the invention apply equally to any computer system, regardless of whether the computer system is a complicated, multi-user computing apparatus or a single user device such as a personal computer or workstation. As shown in FIG. 1, computer system 120 includes main or central processing unit (CPU) 122 connected through system bus 121 to main memory 130, memory controller 124, auxiliary storage interface 126, and terminal interface 128.

Auxiliary-storage interface 126 allows computer system 120 to store and retrieve information from auxiliary storage such as magnetic disk, magnetic tape or optical-storage devices. Auxiliary-storage interface 126 could be fixed or removable media and also could be located on another computer system. Memory controller 124, through use of a processor separate from CPU 122, moves information between main memory 130, auxiliary-storage interface 126, and CPU 122. While for the purposes of explanation, memory controller 124 is shown as a separate entity, in practice, portions of the function provided by memory controller 124 may actually reside in the circuitry associated with CPU 122 and main memory 130. Further, while memory controller 124 of the embodiment is described as having responsibility for moving requested information between main memory 130, auxiliary-storage interface 126 and CPU 122, the mechanisms of the present invention apply equally to any storage configuration, regardless of the number and type of the storage entities involved.

Terminal interface 128 allows system administrators, computer programmers, and users to communicate with computer system 120, normally through programmable workstations.

Main memory 130 stores software, including compiler 140 (comprising analyzer 142, parser 144, optimizer 146, and code generator 148) and operating system 132. Memory 130 also includes workspace 150, which stores a computer program in various stages of compilation, including source-code representation 152, intermediate representation 154, and object code 158. Memory 130 also contains static profile-data file 160. But, memory 130 will not necessarily always contain all parts of all mechanisms shown. For example, portions of compiler 140 and operating system 132 will typically be loaded into caches in CPU 122 to execute, while other files may well be stored on magnetic or optical disk storage devices. Moreover, the various representations 152, 154, and 158 of a computer program may not be resident in the main memory at the same time. Various representations may also be created by modifying a prior representation in situ. In addition, as discussed above, the front-end and back-end of the compiler, in some systems, may be separate programs.

CPU 122 is suitably programmed to carry out the preferred embodiment by compiler 140, as described in more detail in the flow charts of FIGS. 2–6. In the alternative, the function of FIGS. 2–6 could be implemented by controlled circuitry through the use of logic gates, programmable-logic devices, or other hardware components in lieu of a processor-based system.

Computer system 120 is merely an example of one system upon which the routines in accord with principles of the present invention may execute. Further, as innumerable alternative system designs may be used, principles of the present invention are not limited to any particular configuration shown herein. For example, although the system depicted in FIG. 1 contains only a single main CPU and a single system bus, the invention also applies to computer systems having multiple CPUs and buses.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include but are not limited to recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as auxiliary-storage interface 126.

Use of Computer System

Figure 2:
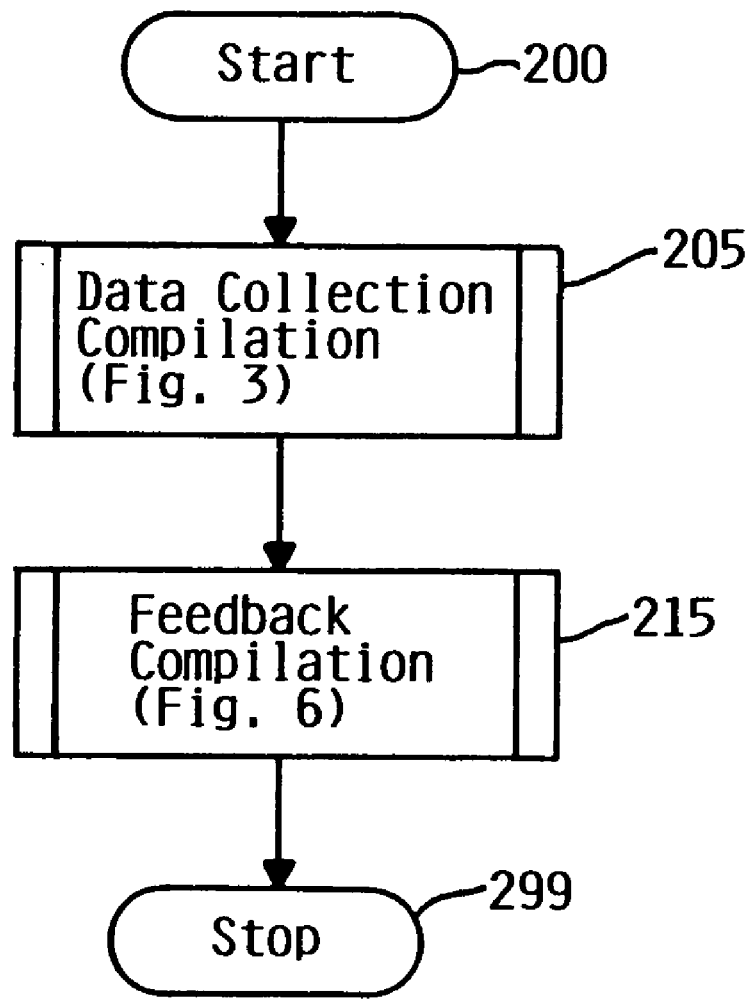
FIGS. 2, 3, 4, 5, and 6 are flowcharts of specific operations performed as part of an optimization of a computer program using inlining in accordance with principles of the present invention.

FIGS. 2–6 are flow charts that describe the operation of the preferred embodiment. Referring to FIG. 2, there is shown an example of the main logic of profiling compiler 140. At block 200, control begins. Control then continues to block 205 where compiler 140 compiles source code 152 in a manner that gathers register-pressure data. Typically, the compiler would gather register-pressure data by inserting instrumentation code into the program to gather statistics about the program's execution at run time. But, insertion of such instrumentation code is independent of the techniques of the invention. The details of block 205 are further described below under the description for FIG. 3.

Referring again to FIG. 2, control then continues to block 215 where compiler 140 compiles source code 152 once again, using the register-pressure data collected at block 205 as extra input to the optimization process. The details of block 215 are further described below under the description for FIG. 6. Referring again to FIG. 2, control then continues to block 299 where compiler 140 stops.

Figure 3:
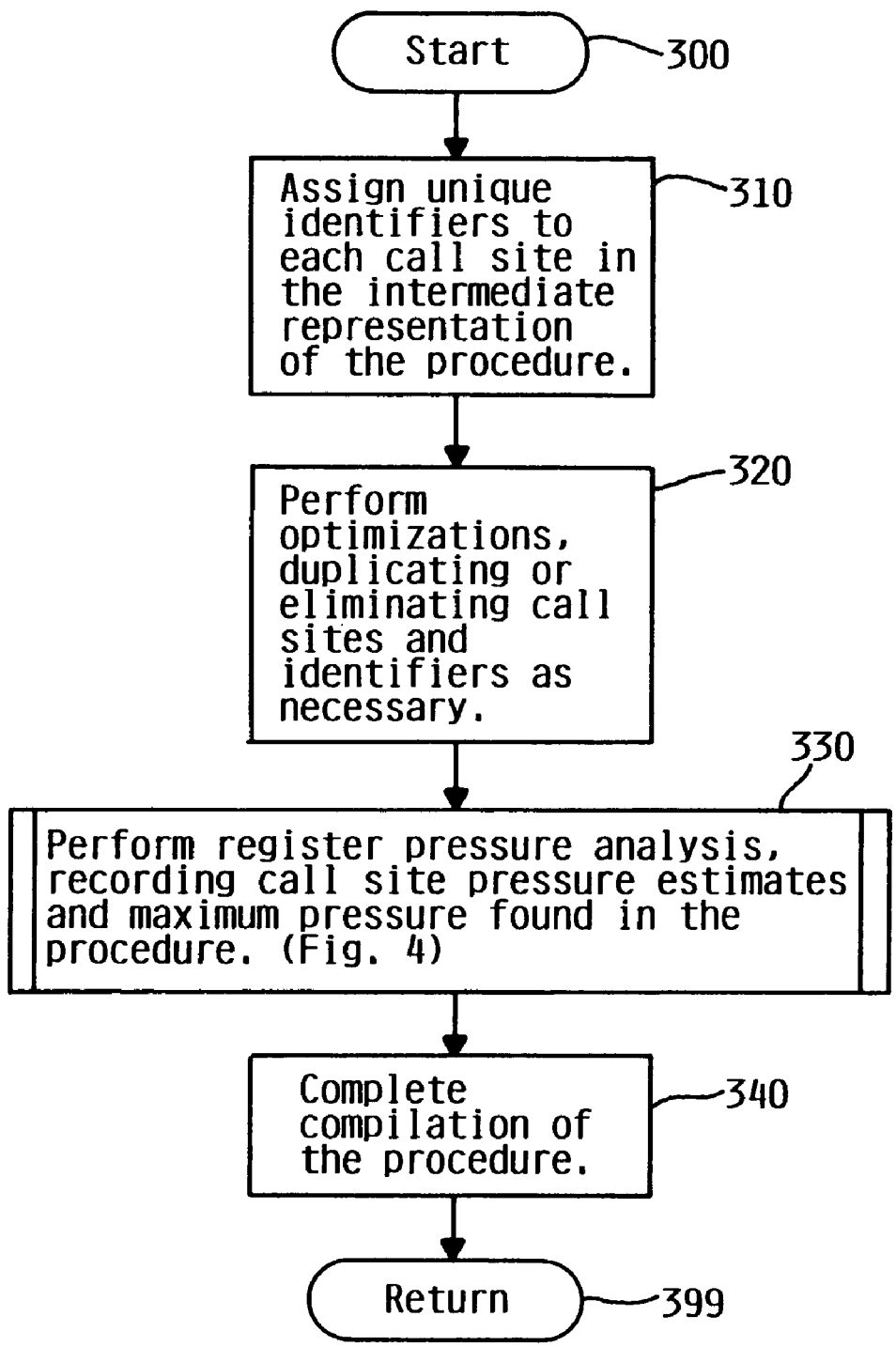

Referring to FIG. 3, there is illustrated sample logic for a function within compiler 140 that is executed once for every procedure "P" in source code 152, which is the compilation unit. Control begins at block 300. Control then continues to block 310 where compiler 140 scans through intermediate executable-code 154 and assigns a unique identifier to each call site "C" that it finds within the procedure. Control then continues to block 320 where compiler 140 performs optimizations on intermediate executable-code 154, duplicating or eliminating call sites and identifiers as necessary. For example, compiler 140 can determine that a call instruction cannot be reached and can, therefore, be eliminated, and compiler 140 can also determine that it would be beneficial to duplicate sections of code that contain call instructions. If the call instruction is duplicated, compiler 140 associates the original call-site identifier with all copies of the call instruction. Optimization continues until the register assignment phase is about to be executed; this phase determines which computed values can be kept in registers and which must be stored in slower memory. Control then continues to block 330 where compiler 140 analyzes the register pressure at each call instruction and the maximum register-pressure found anywhere in the procedure, as further described below under the description for FIG. 4. Control then continues to block 340 where compiler 140 generates the final version of intermediate executable-code 154. Control then continues to block 399 where the function returns.

Figure 4:
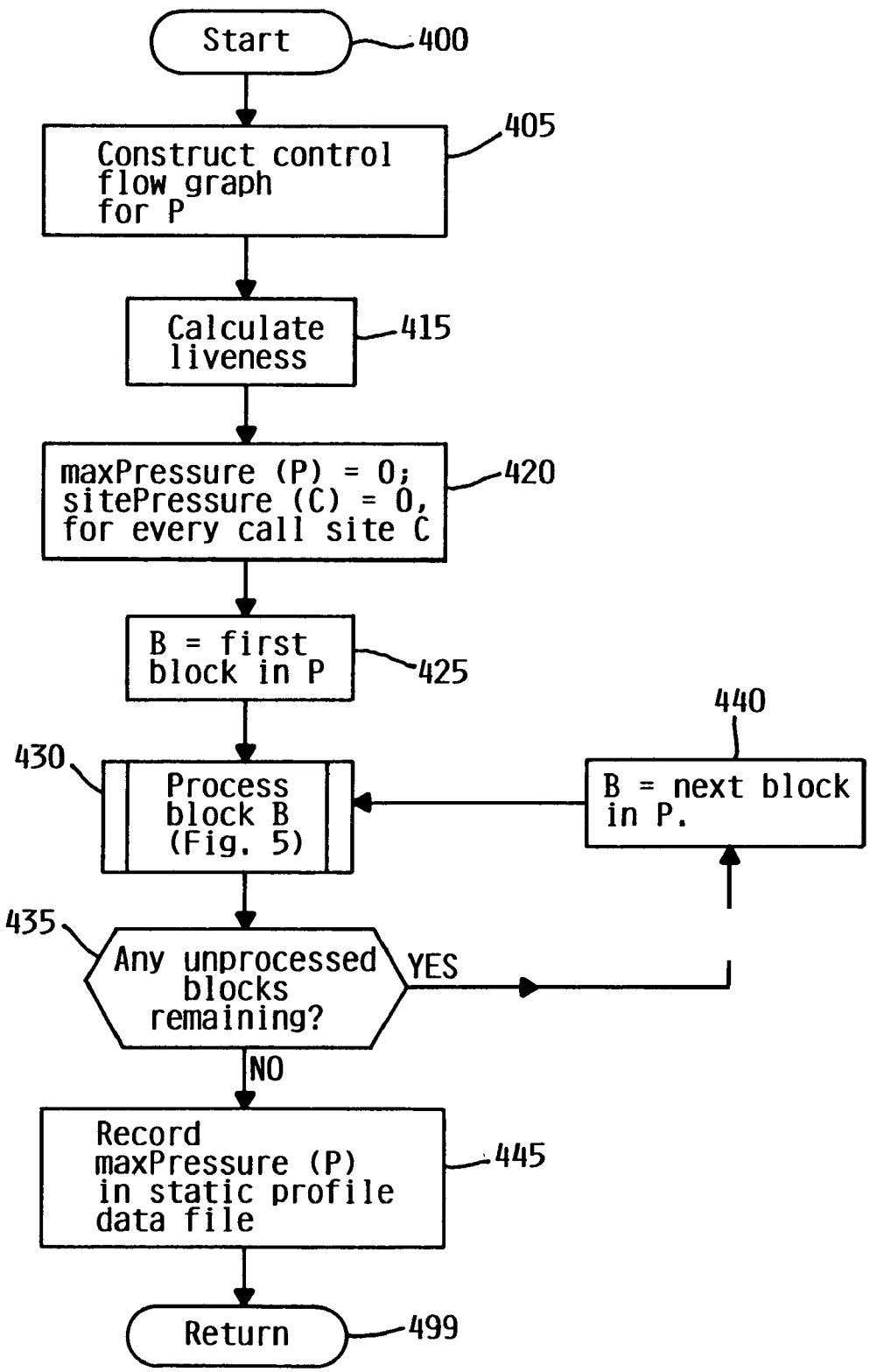

Referring to FIG. 4, there is illustrated the portion of compiler 140 that performs register-pressure analysis. Control begins at block 400. Control then continues to block 405 where compiler 140 constructs a control-flow graph for procedure "P".

Control then continues to block 415 where compiler 140 calculates the "liveness" of procedure P. This analysis determines which symbolic registers in procedure P are live at the beginning and end of each basic block in the procedure. To be "live" at a point means that the value of the symbolic register is needed along at least one possible forward-execution path in the procedure starting at that point.

Control then continues to block 420 where compiler 140 initializes to zero the variable "maxPressure", which will record the maximum register-pressure found anywhere in procedure P. Compiler 140 also initializes to zero a site-pressure array that contains one entry for each unique call-site identifier C, previously assigned at block 310. Control then continues to block 425 where compiler 140 sets the variable B to be the first block in procedure P.

Control then continues to a loop represented by blocks 430, 435, and 440, which processes each block B in the control-flow graph of procedure P. At block 430, compiler 140 processes each block B, as further described below under the description of FIG. 5. Referring again to FIG. 4, control then continues to block 435 where compiler 140 determines whether there are any unprocessed blocks remaining. If the determination at block 435 is true, then control continues to block 440 where compiler 140 sets "B" to the next block in procedure P. Control then returns to block 430, as previously described above.

When the determination at block 435 is false, then the loop has completed for all blocks, so control continues to block 445 where compiler 140 records "maxPressure" in static profile-data file 160. Control then continues to block 499 where the function returns.

Figure 5A:
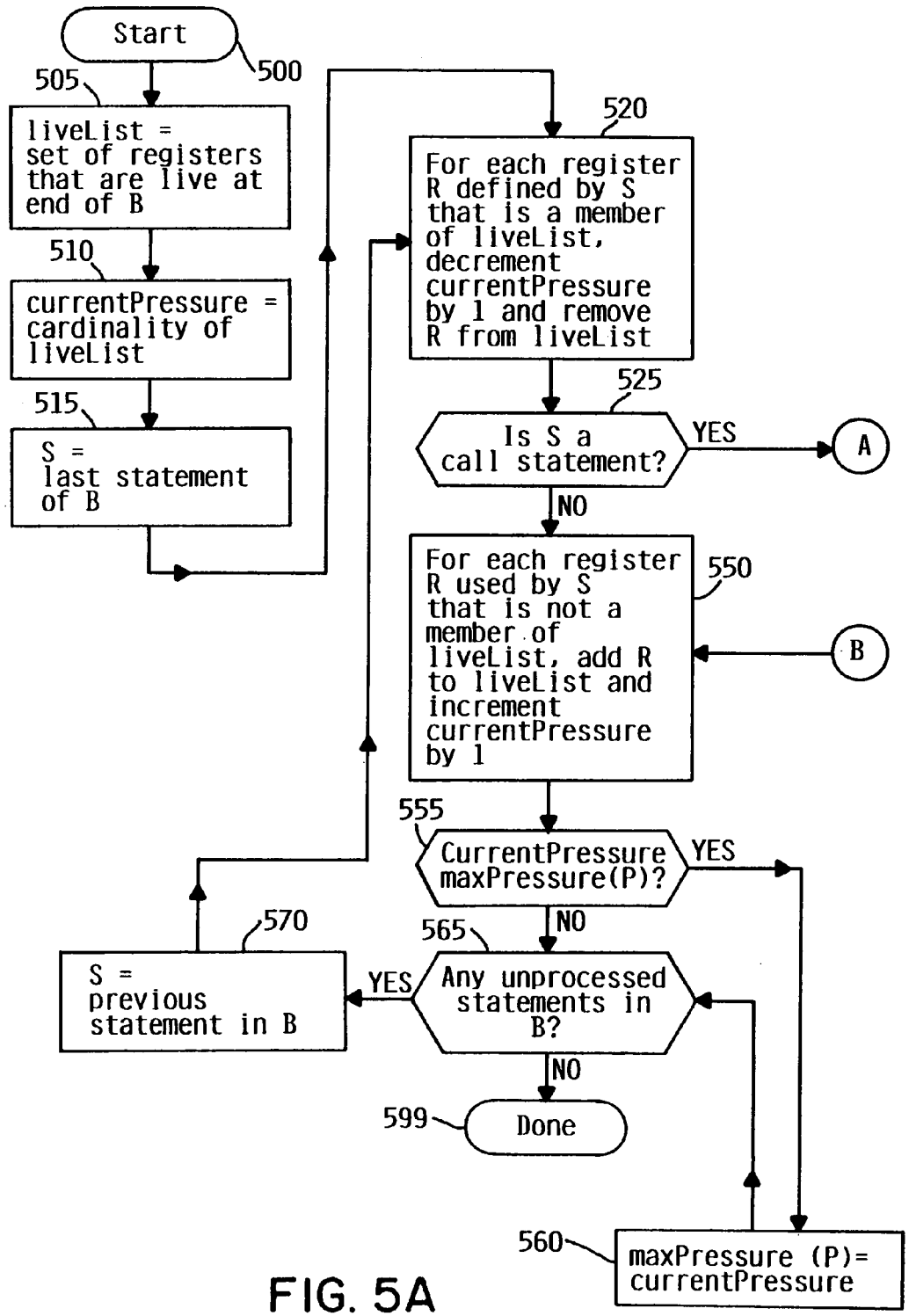
Figure 5B:
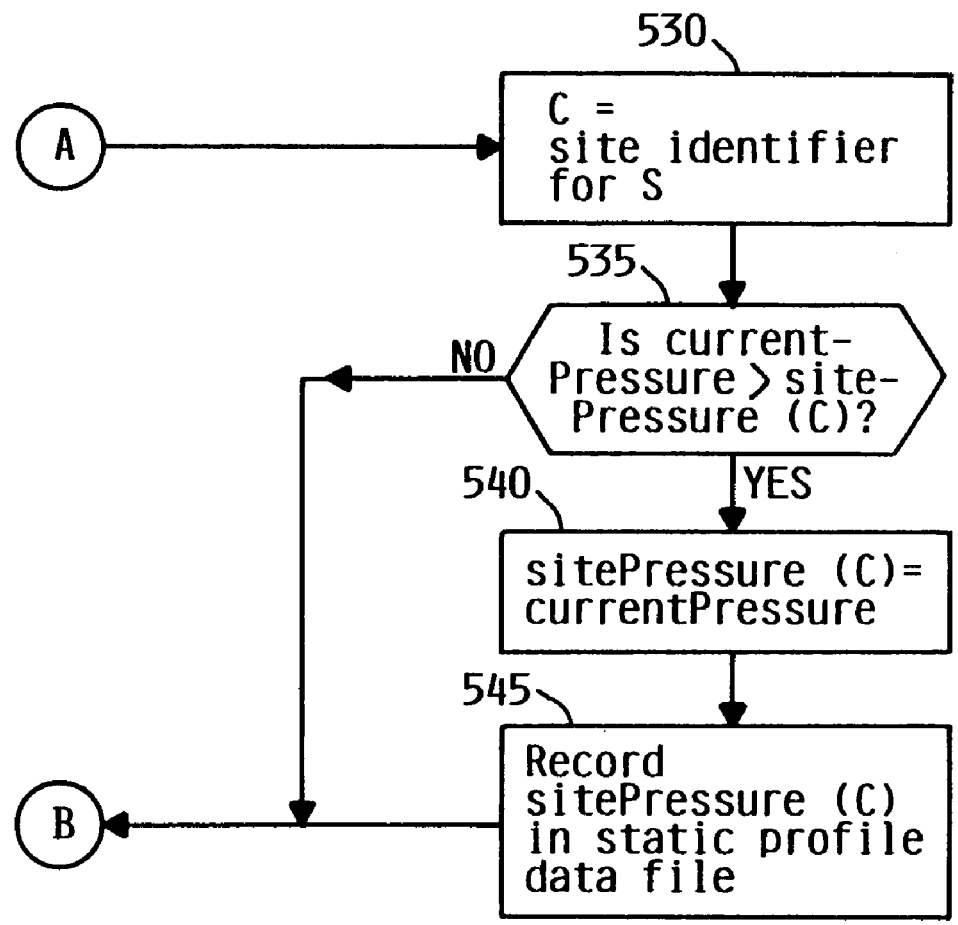

Referring to FIG. 5, there is shown sample logic for a function within compiler 140 that performs the register-pressure analysis for a particular block B. At block 500, control begins. Control then continues to block 505 where compiler 140 sets variable livelist to contain the live, symbolic registers at the end of block B, as previously determined at block 415. Control then continues to block 510 where compiler 140 sets the variable current pressure to the number of these registers.

Compiler 140 in blocks 515–570 then processes each statement in block B, starting with the last statement and working backwards to the first statement. At block 515, compiler 140 sets statement S to be the last statement of block B. Control then continues to block 520 where compiler 140 determines how many registers in livelist are defined by statement S, decrements current pressure by that amount, and removes those registers from the livelist, for a statement S.

Control then continues to block 525 where compiler 140 determines whether statement S is a call instruction.

If the determination at block 525 is true, then control continues to block 530 where compiler 140 sets C to be the site identifier for statement S. Control then continues to block 535 where compiler 140 determines whether the current pressure is greater than the site pressure of C. If the determination at block 535 is true, then control continues to block 540 where compiler 140 sets the site pressure of C to be the current pressure. Control then continues to block 545 where compiler 140 records the site pressure of C in static profile-data file 160. This processing is necessary because there may be more than one call instruction associated with a given site identifier C, due to earlier optimizations. Control then continues to block 550. If the determination at block 535 was false, then control continues directly to block 550.

At block 550, compiler 140 determines how many registers are used by statement S that do not already appear in livelist, increments current pressure by that amount, and adds them to livelist. Control then continues to block 555 where compiler 140 determines whether current pressure is greater than the maximum pressure of procedure P. If the determination at block 555 is true, then control continues to block 560 where compiler 140 sets the maximum pressure of procedure P to be the current pressure.

Control then continues to block 565. If the determination at block 555 was false, then control continues directly to block 565. At block 565, compiler 140 determines whether there are any unprocessed statements left in B. If the determination at block 565 is false, then control continues to block 599 where the function returns. If, on the other hand, the determination at block 565 is true, then control continues to block 570 where compiler 140 sets statement S to be the previous statement in B. Control then returns to block 520 as previously described above.

If the determination at block 525 is false, then control continues directly to block 550, as previously described above.

Figure 6A:
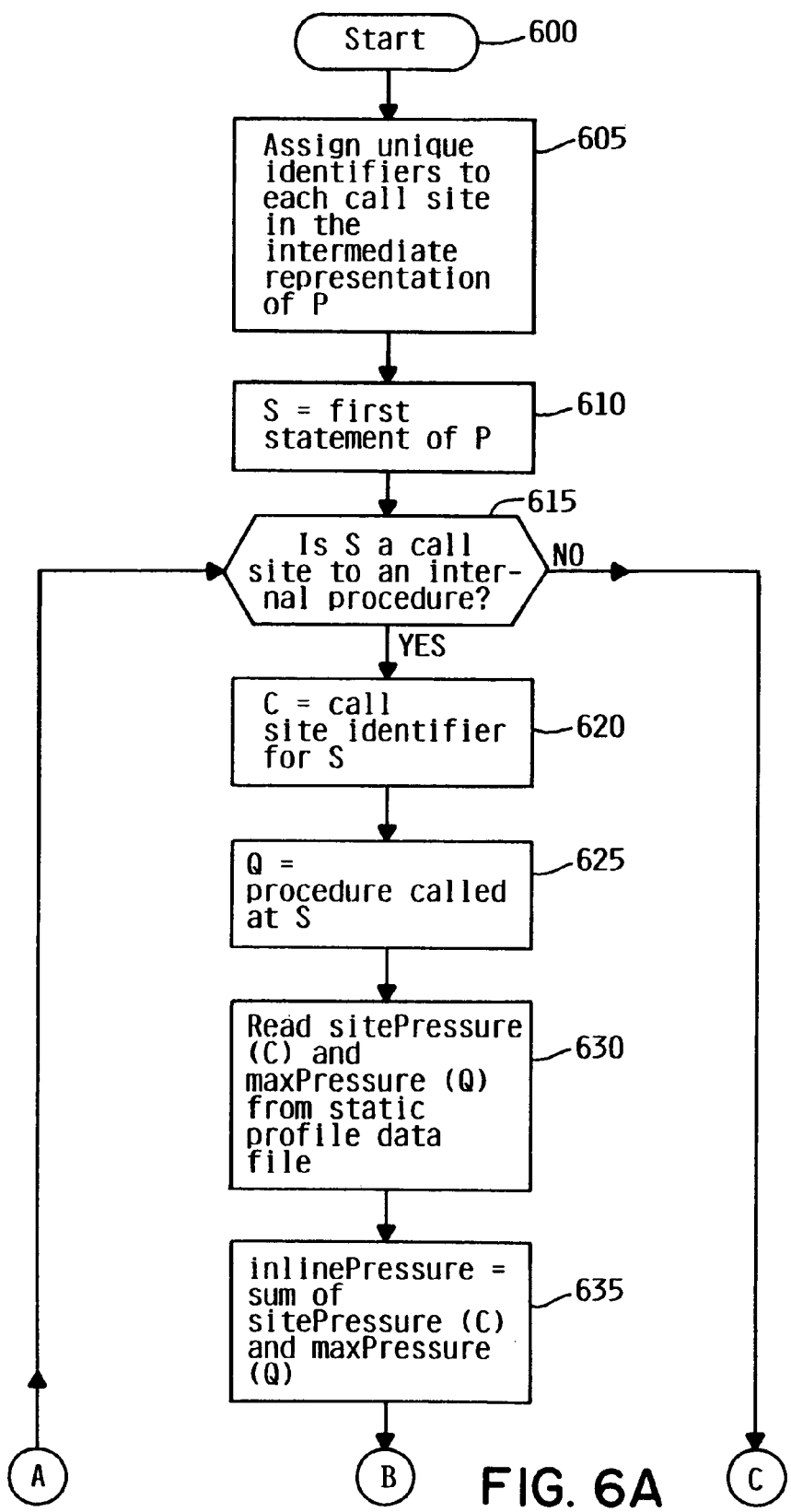
Figure 6B:
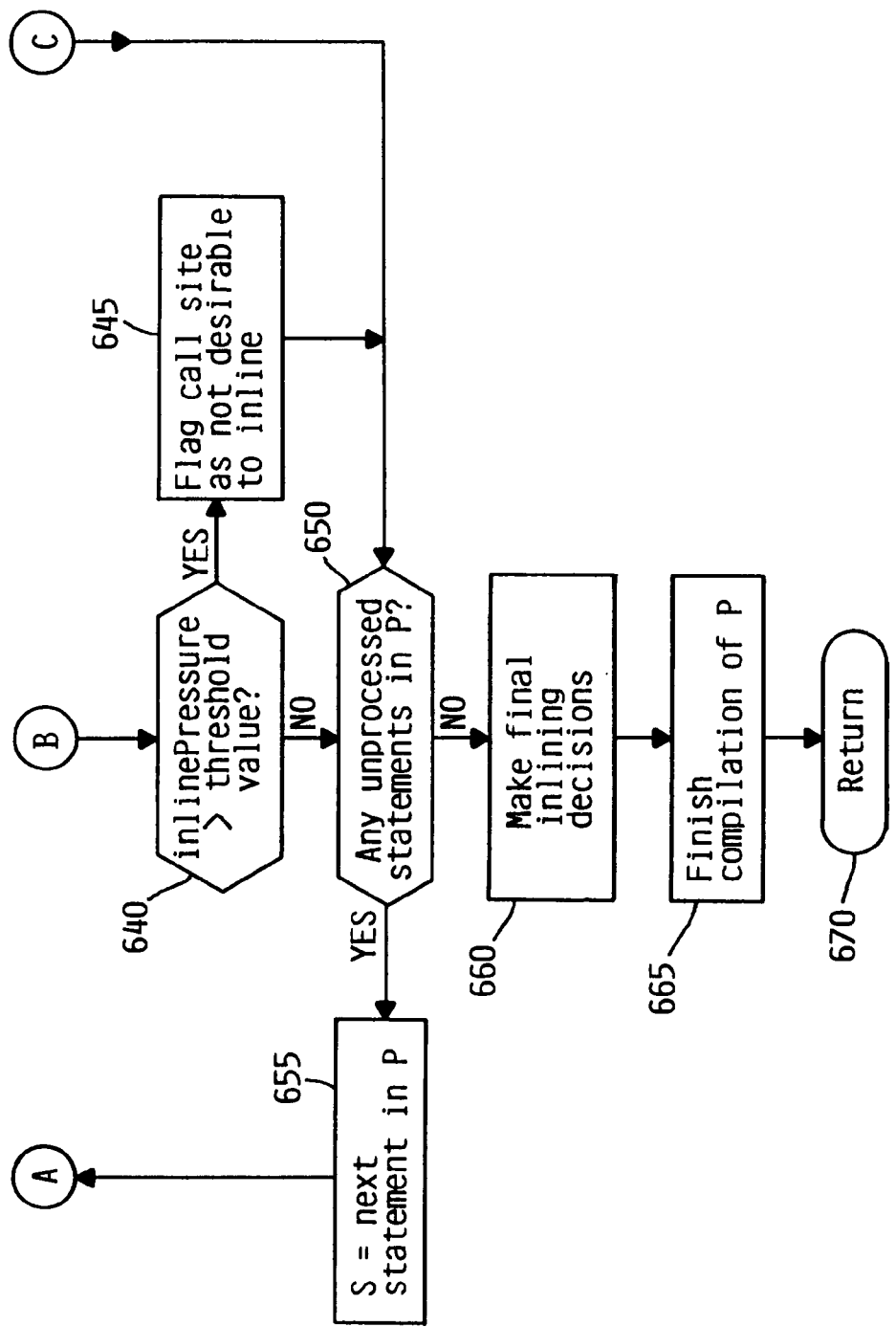

Referring to FIG. 6, there is illustrated sample logic of compiler 140 that processes the feedback compilation. At block 600, control begins. Control then continues to block 605 where compiler 140 repeats the assignment of call-site identifiers previously done at block 310. Since the intermediate representation of procedure P is the same on entry to the data collection and feedback compilations, the identifiers are assigned in the same manner.

Compiler 140 then processes each statement in procedure P at blocks 610–655. At block 610, compiler 140 sets statement S to be the first statement of procedure P. Control then continues to block 615 where compiler 140 determines whether statement S is a call site to an internal procedure. If the determination at block 615 is false, then control continues to block 650 where compiler 140 determines whether there are any unprocessed statements in procedure P. If the determination at block 650 is true, then control continues to block 655 where compiler 140 sets statement S to be the next statement in procedure P. Control then returns to block 615, as previously described above. Thus, the action of blocks 615 and 650 cause compiler 140 to ignore statements that are not call sites that target a procedure in the same compilation unit.

If the determination at block 615 is true, then control continues to block 620 where compiler 140 sets C to be the call site identifier for the current statement S. Control then continues to block 625 where compiler 140 assigns Q to be the identifier of the procedure called from statement S. Control then continues to block 630 where compiler 140 reads the values of the site pressure of C and the maximum pressure of procedure-identifier Q from static profile-data file 160. Control then continues to block 635 where compiler 140 sums the site pressure of C and the max pressure of procedure-identifier Q and sets their sum to be the inline pressure.

Control then continues to block 640 where compiler 140 compares the inline pressure previously calculated at block 635 to a threshold value representing the maximum total-register pressure that is desirable to be introduced by inlining. This threshold value may be the number of physical registers in the computer system, or it may be slightly more or less than this depending on the expected effects of optimization after inlining. If the inlining pressure exceeds this threshold value, then control continues to block 645 where compiler 140 flags the call site as not desirable for inlining. Control then continues to block 650, as previously described above. If the determination at block 640 is false (the inline pressure is not greater than the threshold value) then control continues directly to block 650 as previously described above.

After all call sites have been processed in this manner, then the determination at block 650 is false, and there are no more unprocessed statements in procedure P, so control continues from block 650 to block 660 where compiler 140 makes decisions about which call sites to inline using existing heuristic techniques. Those call sites flagged as undesirable for inlining at block 645 will not be inlined at block 660. Control then continues to block 665 where compiler 140 finishes the compilation. Control then continues to block 670 where the function returns.

It will therefore be appreciated that the invention provides significant advantages in terms of optimization of computer procedures during compilation, resulting in more efficient code generation. It will also be appreciated that numerous modifications may be made to the disclosed embodiments consistent with the invention, without departing from the spirit and scope of the invention. For example, if there are multiple classes of physical registers in a computer system, such as fixed-point registers and floating-point registers, the register-pressure analysis could be done separately for each class. For example, there would be a maximum fixed-pressure and a maximum floating-pressure for each procedure, at a site fixed-pressure and a site floating-pressure for each call site. If inlining would violate the pressure threshold for any register class, it would be marked undesirable to inline. Therefore, the invention lies in the claims hereinafter appended.

What is claimed is:

1. A computer-implemented method for optimizing a computer program comprising a child procedure and a parent procedure, wherein the parent procedure comprises at least one statement that invokes the child procedure, wherein the method comprises:
   saving site register-pressure data from the execution of a first compilation; and
   making at least one inlining decision using the site register-pressure data during a second compilation.

2. The method of claim 1, further comprising:
   saving a maximum register-pressure occurring in each procedure in the computer program; and
   making the at least one inlining decision using the maximum register-pressure data.

3. The method of claim 2, wherein the site register-pressure data comprises:
   a register pressure at each call site in the computer program that is a potential inlining candidate.

4. The method of claim 1, wherein the making step further comprises:
   inlining the child procedure of the computer program into the parent procedure, in place of the statement that invokes the child procedure.

5. A method for optimizing a computer program comprising a child procedure and a parent procedure, wherein the parent procedure comprises at least one statement that invokes the child procedure, wherein the method comprises:
   saving site register-pressure data from the execution of a first compilation, wherein the site registure pressure data comprises a register pressure at each call site in the computer program that is a potential inlining candidate; and
   making at least one inlining decision using the site register-pressure data during a second compilation, wherein when deciding whether to inline the child procedure into the parent procedure, determining whether a sum of a maximum register-pressure in the parent procedure and the site register-pressure exceeds a number of available registers.

6. The method of claim 5, further comprising:
   when the determining step is true, refraining from inlining the child procedure into the parent procedure.

7. The method of claim 5, further comprising:
   when the determining step is false, inlining the child procedure into the parent procedure in place of the statement that invokes the child procedure.

8. The method of claim 7, further comprising:
   setting the maximum register-pressure of the parent procedure to be a maximum of its existing value or the sum of the maximum register-pressure of the child procedure and the site register-pressure.

9. A computer system for compiling a computer program including a child procedure and a parent procedure which includes one or more statements that invoke the child procedure, into a machine-readable representation, the computer system comprising:
   an optimizer that optimizes the computer program into an optimized representation, the optimizer saving site register-pressure data from the execution of a first compilation, and making at least one inlining decision using the site register-pressure data during a second compilation; and
   a machine-readable code generator that generates a machine-readable representation of the computer program from the optimized representation.

10. The computer system of claim 9, wherein the optimizer further:
    saves a maximum register-pressure occurring in each procedure in the computer program; and
    makes the at least one inlining decision using the maximum register pressure data.

11. The computer system of claim 10, wherein the site register-pressure data comprises:
    a register pressure at each call site in the computer program that is a potential inlining candidate.

12. The computer system of claim 9, wherein the optimizer further comprises:
    inlining the child procedure of the computer program into the parent procedure, in place of the statement that invokes the child procedure.

13. A computer system for compiling a computer program including a child procedure and a parent procedure which includes one or more statements that invoke the child procedure, into a machine-readable representation, the computer system comprising:

an optimizer that optimizes the computer program into an optimized representation, the optimizer saving site register-pressure data from the execution of a first compilation, and making at least one inlining decision using the site register-pressure data during a second compilation;

wherein the site register-pressure data comprises a register pressure at each call site in the computer program that is a potential inlining candidate; and wherein, when deciding whether to inline the child procedure into the parent procedure, the optimizer further determines whether a sum of a maximum register-pressure in the parent procedure and the site register-pressure exceeds a number of available registers; and a machine-readable code generator that generates a machine-readable representation of the computer program from the optimized representation.

14. The computer system of claim 13, wherein the optimizer further comprises:

when the determining step is true, refraining from inlining the child procedure into the parent procedure.

15. The computer system of claim 13, wherein the optimizer further comprises:

when the determining step is false, inlining the child procedure into the parent procedure in place of the statement that invokes the child procedure.

16. The computer system of claim 15, wherein the optimizer further comprises:

setting the maximum register-pressure of the parent procedure to be a maximum of its existing value or the sum of the maximum register-pressure of the child procedure and the site register-pressure.

17. A program product for optimizing a computer program that includes a child procedure and a parent procedure that comprises at least one statement that invokes the child procedure, comprising:

an optimizer that saves site register-pressure data from the execution of a first compilation, and makes at least one inlining decision using the site register-pressure data during a second compilation; and tangible media bearing the optimizer.

18. The program product of claim 17, wherein the optimizer further:

saves a maximum register-pressure occurring in each procedure in the computer program; and makes the at least one inlining decision using the maximum register-pressure data.

19. The program product of claim 18, wherein the site register-pressure data comprises:

a register pressure at each call site in the computer program that is a potential inlining candidate.

20. The program product of claim 17, wherein the optimizer further:

inlines the child procedure of the computer program into the parent procedure, in place of the statement that invokes the child procedure.

21. A program product for optimizing a computer program that includes a child procedure and a parent procedure that comprises at least one statement that invokes the child procedure, comprising:

an optimizer that saves site register-pressure data from the execution of a first compilation, and makes at least one inlining decision using the site register-pressure data during a second compilation;

wherein the site register-pressure data comprises a register pressure at each call site in the computer program that is a potential inlining candidate; and wherein, when deciding whether to inline the child procedure into the parent procedure, the optimizer determines whether a sum of a maximum register-pressure in the parent procedure and the site register-pressure exceeds a number of available registers; and tangible media bearing the optimizer.

22. The program product of claim 21, wherein the optimizer further:

when the determining step is true, refrains from inlining the child procedure into the parent procedure.

23. The program product of claim 21, wherein the optimizer further:

when the determining step is false, inlines the child procedure into the parent procedure in place of the statement that invokes the child procedure.

24. The program product of claim 23, wherein the optimizer further:

sets the maximum register-pressure of the parent procedure to be a maximum of its existing value or the sum of the maximum register-pressure of the child procedure and the site register-pressure.

* * * * *